US012082309B2

United States Patent
Foster et al.

(10) Patent No.: US 12,082,309 B2
(45) Date of Patent: Sep. 3, 2024

(54) SYSTEMS AND METHODS FOR PROVIDING MAC-LEVEL WIRELESS MESH NETWORKS INCORPORATING LONG-RANGE PATHWAYS

(71) Applicant: CNH Industrial America LLC, New Holland, PA (US)

(72) Inventors: Christopher A. Foster, Mohnton, PA (US); Charles Edward Byrd, Jr., Rising Fawn, GA (US); Hilgad Montelo Da Silva, Downers Grove, IL (US)

(73) Assignee: CNH Industrial America LLC, New Holland, PA (US)

( * ) Notice: Subject to any disclaimer, the term of this patent is extended or adjusted under 35 U.S.C. 154(b) by 657 days.

(21) Appl. No.: 17/374,248

(22) Filed: Jul. 13, 2021

(65) Prior Publication Data

US 2022/0022284 A1   Jan. 20, 2022

Related U.S. Application Data

(60) Provisional application No. 63/051,987, filed on Jul. 15, 2020.

(51) Int. Cl.
*H04W 4/40* (2018.01)
*H04W 88/06* (2009.01)
*H04W 84/18* (2009.01)

(52) U.S. Cl.
CPC .............. *H04W 88/06* (2013.01); *H04W 4/40* (2018.02); *H04W 84/18* (2013.01)

(58) Field of Classification Search
CPC ....... H04W 88/06; H04W 4/40; H04W 84/18; H04W 4/80
See application file for complete search history.

(56) References Cited

U.S. PATENT DOCUMENTS

| 7,675,882 | B2 * | 3/2010 | Mighani | ............... | H04W 84/00 370/328 |
| 8,917,671 | B2 * | 12/2014 | Jing | ..................... | H04W 24/08 370/254 |
| 10,021,614 | B2 | 7/2018 | Ross et al. | | |

(Continued)

*Primary Examiner* — Julio R Perez
(74) *Attorney, Agent, or Firm* — Rickard K. DeMille; Rebecca L. Henkel; Peter K. Zacharias (57) ABSTRACT

In one aspect, a system for providing a wireless mesh network includes a plurality of wireless mesh nodes positioned relative to an outdoor area, with the wireless mesh nodes comprising a plurality of stationary nodes spaced apart from one another across the outdoor area and a plurality of mobile nodes configured to be moved across the outdoor area. Each of the nodes is formed from a respective wireless communication device, with each wireless communication device being configured to function as a Media Access Control (MAC) level device when communicating data across the wireless mesh network. Additionally, the wireless communication device forming each respective mobile node is configured to communicate data across the wireless mesh network using a short-range wireless communications protocol. Moreover, at least a portion the wireless communication devices forming the stationary nodes are configured to communicate data across the wireless mesh network using a long-range wireless communications protocol.

20 Claims, 4 Drawing Sheets

(56) References Cited

U.S. PATENT DOCUMENTS

| | | | |
|---|---|---|---|
| 10,085,137 B1 | 9/2018 | Dollinger et al. | |
| 10,440,547 B2 | 10/2019 | Ameixieira | |
| 10,537,062 B2 | 1/2020 | Brubaker | |
| 11,723,101 B1* | 8/2023 | Livingston | H04W 24/04 |
| | | | 370/225 |
| 2012/0008542 A1* | 1/2012 | Koleszar | H04W 40/00 |
| | | | 370/312 |
| 2016/0135204 A1* | 5/2016 | Mishra | H04W 24/08 |
| | | | 370/332 |
| 2016/0198362 A1* | 7/2016 | Freeburg | H04W 24/02 |
| | | | 455/447 |
| 2019/0090472 A1 | 3/2019 | Crinklaw et al. | |
| 2020/0110423 A1 | 4/2020 | Antich | |
| 2022/0022284 A1* | 1/2022 | Foster | H04W 4/80 |
| 2023/0306502 A1* | 9/2023 | Baker, Jr. | G06F 16/24573 |
| 2023/0309068 A1* | 9/2023 | Zhang | H04W 72/23 |
| 2023/0309192 A1* | 9/2023 | Haustein | H04B 7/0617 |

* cited by examiner

SYSTEMS AND METHODS FOR PROVIDING MAC-LEVEL WIRELESS MESH NETWORKS INCORPORATING LONG-RANGE PATHWAYS

CROSS-REFERENCE TO RELATED APPLICATIONS

The present application is based upon and claims the right of priority to U.S. Provisional Patent Application No. 63/051,987, filed Jul. 15, 2020, the disclosure of which is hereby incorporated by reference herein in its entirety for all purposes.

FIELD OF THE INVENTION

The present subject matter relates generally to Media Access Control (MAC) level (or data link layer) wireless mesh networks, and, more particularly, to systems and methods for establishing or providing a MAC-level wireless mesh network that incorporates one or more wireless communication devices utilizing a long-range wireless communications protocol (e.g., a cellular wireless communications protocol) as a wireless node(s) to provide one or more associated long-range pathways across the network.

BACKGROUND OF THE INVENTION

Traditional wireless networks typically rely on a small number of wireless hotspots or communications devices, thereby providing a relatively simple network architectures that can be established with relatively low costs. However, when establishing wireless networks across expensive regions that are often remote to urban areas, the network architecture often becomes very complex and the network infrastructure costs are typically quite high. For instance, in the case of wireless mobile equipment networks, such as a wireless network adapted to be used by work vehicles across an expansive agricultural area (e.g., a large farm) or worksite, the required infrastructure associated with setting up and/or expanding the network is typically cost-prohibitive for most operators/managers of a mobile equipment fleet.

To address the issues associated with network complexity, it has been proposed to utilize localized wireless mesh networks to allow communications between mobile equipment (e.g., work vehicles) and an associated base station(s) across an outdoor work area. However, given the relatively short-range communications provided across conventional mesh networks, a significant large number of nodes must be established to provide the desired coverage area, thereby driving up costs. For instance, mesh networks using a Dedicated Short-Range Communications (DSRC) protocol typically have a maximum communication range of about 1 kilometer. However, in certain instances, it is desirable to have a mobile equipment network that spans tens or even hundreds of kilometers, such as in the case of large-scale commercial farms and other expansive worksites in which the work areas are non-contiguous or otherwise divided across an even larger area.

Accordingly, systems and methods for establishing or providing an improved wireless mesh network that incorporates one or more wireless communication devices utilizing a long-range wireless communications protocol as a MAC-level wireless node(s) to allow for long-range pathways across the mesh network and, thus, increased coverage area would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for providing a wireless mesh network. The system includes a plurality of wireless mesh nodes positioned relative to an outdoor area, with the wireless mesh nodes comprising a plurality of stationary nodes spaced apart from one another across the outdoor area and a plurality of mobile nodes configured to be moved across the outdoor area. Each of the nodes is formed from a respective wireless communication device, with each wireless communication device being configured to function as a Media Access Control (MAC) level device when communicating data across the wireless mesh network. Additionally, the wireless communication device forming each respective mobile node is configured to communicate data across the wireless mesh network using a short-range wireless communications protocol. Moreover, at least a portion the wireless communication devices forming the stationary nodes are configured to communicate data across the wireless mesh network using a long-range wireless communications protocol.

In another aspect, the present subject matter is directed to a method for providing a wireless mesh network. The method includes establishing a plurality of wireless mesh nodes across an outdoor area. Each of the nodes is formed from a respective wireless communication device, with each wireless communication device being configured to function as a Media Access Control (MAC) level device when communicating data across the wireless mesh network. The method also includes wirelessly communicating data across the outdoor area between neighboring nodes of the plurality of wireless mesh nodes. Additionally, when wirelessly communicating the data, the method includes communicating data across one or more first pathways defined between one or more first pairs of wireless communication devices forming respective first neighboring nodes within the wireless mesh network via a short-range wireless communications protocol, and communicating data across one or more second pathways defined between one or more second pairs of wireless communication devices forming respective second neighboring nodes within the wireless network via a long-range wireless communications protocol.

In a further aspect, the present subject matter is directed to a system for providing a Media Access Control (MAC) level wireless mesh network, with the system including one or more components configured in accordance with one or more of the embodiments disclosed herein.

In yet another aspect, the present subject matter is directed to a method for providing a Media Access Control (MAC) level wireless mesh network consistent with one or more of the embodiments disclosed herein These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for establishing a Media Access Control (MAC) level wireless mesh network, also referred to herein as a data link layer (or OSI layer 2) mesh network. The mesh network is generally formed from a plurality of wireless mesh nodes spaced apart across an outdoor area. In several embodiments, the mesh nodes may include a plurality of mobile nodes and a plurality of stationary nodes. For instance, in one embodiment, each mobile node may be associated with a work vehicle configured to be traversed across the outdoor area, such as an agricultural work vehicle configured to be moved across the outdoor area during the performance of an agricultural operation, while each stationary node may be associated with stationary network infrastructure. In such an embodiment, the wireless mesh network is generally equipped to allow for both vehicle-to-vehicle communications and vehicle-to-infrastructure communications as data is being wirelessly transmitted across the network.

In several embodiments, each wireless mesh node (including each mobile node and each stationary node) is formed by a respective wireless communication device configured to function as a MAC-level device that operates on the data link layer using MAC addresses to transmit data across the network. In other words, the wireless communications devices forming the various nodes are configured to facilitate node-to-node communications without routing data to a remote network (e.g., the internet). Additionally, in accordance with aspects of the present subject matter, the node-to-node communications across the network may be executed using two or more different wireless communications protocols. Specifically, in several embodiments, the wireless communications devices forming at least a portion of the nodes may be configured to transmit data across the wireless network according to a long-range wireless communications protocol (thereby forming long-range nodes), while the wireless communications devices forming the remainder of the nodes may be configured to transmit data across the wireless network according to a short-range wireless communications protocol (thereby forming short-range nodes).

For instance, in one embodiment, a subset of the wireless communications devices forming the stationary nodes may be configured to communicate data across the network using a long-range cellular wireless communications protocol, such as the Long-Term Evolution (LTE) protocol. In such an embodiment, the wireless communications devices forming the remainder of the stationary nodes, as well as the mobile nodes, may be configured to communicate data across the network using a short-range wireless communications protocol, such a Dedicated Short-Range Communications (DSRC) protocol. As a result, the available pathways between neighboring nodes may include, for example, both LTE channels and DSRC channels.

By providing a wireless mesh network incorporating one or more long-range nodes that communicate via a long-range wireless communications protocol, the network may be adapted to cover an expansive area while reducing the amount of infrastructure that would otherwise be required for a network including only short-range nodes. Moreover, given that all of the nodes (including the long-range nodes) operate within the data link layer, the overall complexity of the network may be reduced significantly, thereby lowering the labor/costs associated with setting up a new wireless mesh network and/or modifying an existing wireless mesh network (e.g., to expand the coverage area). For example, by configuring the long-range nodes to function as MAC-level nodes in the same manner as the short-range nodes, the typical complexities associated with establishing long-range communications (e.g., via layer 3 routing to the internet) can be completely eliminated. Specifically, the various short-range and long-range nodes can be incorporated into single system with a single configuration that can pass data between nodes over both short-range pathways (e.g., 802.11 pathways) and long-range pathways (e.g., LTE pathways).

Figure 1:
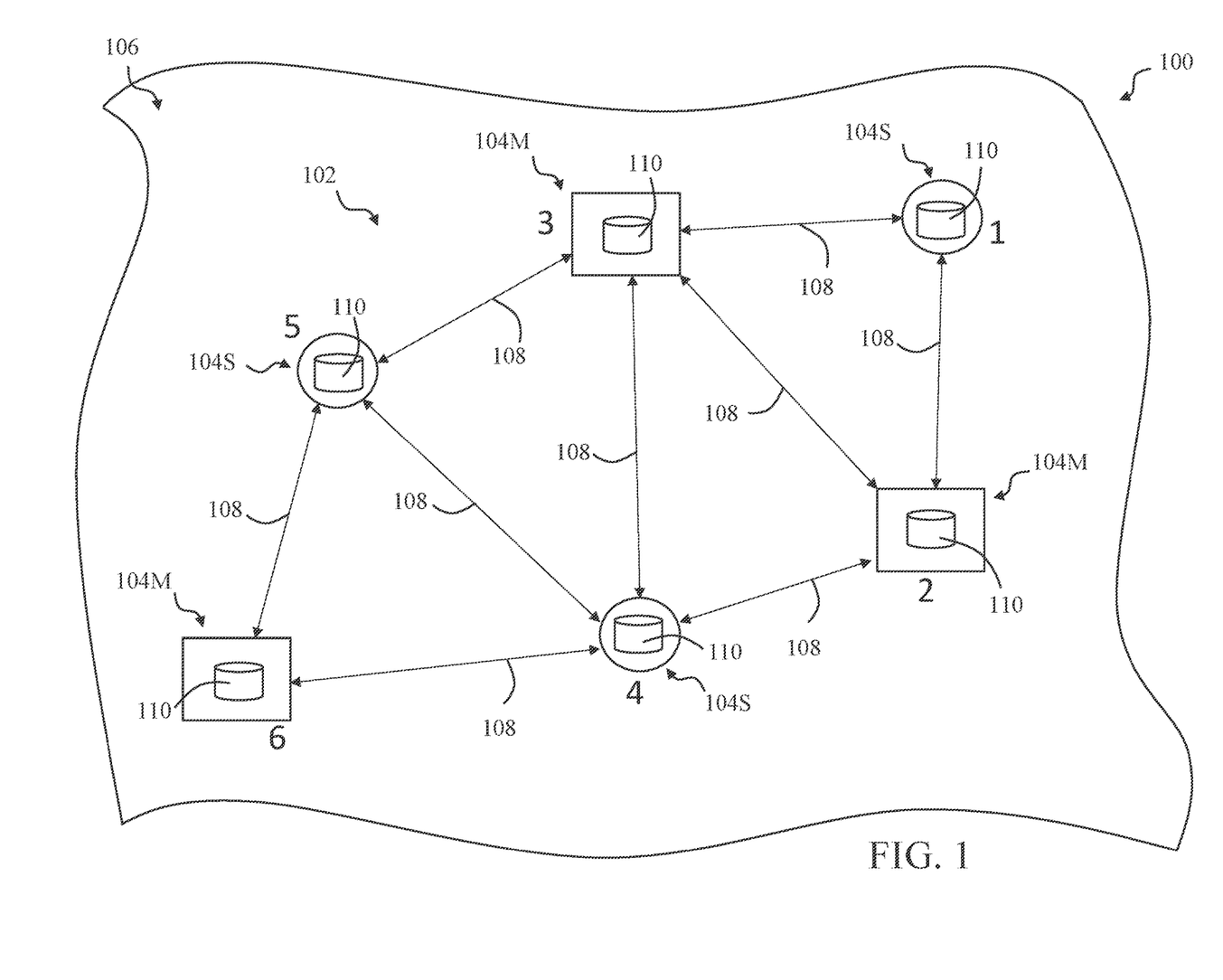
FIG. 1 illustrates a schematic view of one embodiment of a system for providing a Media Access Control (MAC) level (or data link layer) wireless mesh network in accordance with aspects of the present subject matter.

Referring now to FIG. 1, a schematic view of one embodiment of a system 100 for providing a Media Access Control (MAC) level (or data link layer) wireless mesh network 102 is illustrated in accordance with aspects of the present subject matter. As shown, the system 100 generally includes a plurality of wireless mesh nodes 104 (e.g., nodes 1-6) spaced apart across or otherwise positioned relative to a given area (e.g., an outdoor area 106), with each node 104 being configured to wirelessly communicate with neighboring nodes 104 across the area 106. For instance, each node 104 may be configured to wirelessly transmit and receive data to/from neighboring nodes 104 located within its wireless communication range (including replicating or forwarding data from one neighboring node 104 to another neighboring node 104). In this regard, the nodes 104 may function to provide a wireless mesh network 102 in which data can be transmitted node-to-node across an area significantly larger than the respective communication ranges of the individual nodes 104. For instance, data available at a first or origin node 104 (e.g., node #1) may be communicated to a second or destination node 104 (e.g., node #6) despite the destination node being outside the wireless communication range of the origin node by transferring such data through one or more intermediate nodes 104 (e.g., any combination of nodes 2-5) via the communication channels or pathways (indicated by arrows 108) defined between neighboring nodes 104 across the network 102.

In accordance with aspects of the present subject matter, at least one of the wireless mesh nodes 104 (and preferably two or more of the wireless mesh nodes 104) corresponds to a mobile node 104M, while the remainder of the other wireless mesh nodes 104 correspond to stationary nodes 104S. For instance, as shown in FIG. 1, the system 100 includes three mobile nodes 104M (e.g., nodes 2, 3, and 6—indicated by the rectangles in FIG. 1) and three stationary nodes 104S (e.g., nodes 1, 4, and 5—indicated by the circles in FIG. 1). However, in general, the disclosed system 100 may include any suitable number/combination of mobile and stationary nodes 104M, 104S. It should be appreciated that, as used herein, the terms "mobile" and "stationary" are used in association with wireless mesh nodes 104 to indicate the typical state of a given node 104 when communicating data across the mesh network 102. For instance, mobile nodes 104M include, but are not limited to, nodes that are installed on/within or otherwise provided in operative association with equipment generally intended to be in motion when communicating data across the wireless network 102, such as work vehicles intended to perform a work operation while moving across an area 106 covered by the network 102. Similarly, stationary nodes 104S include, but are not limited to, nodes that are installed on/within or otherwise provided in operative association with infrastructure that is generally intended to be non-mobile or stationary when communicating data across the wireless network 102, such as antenna towers, base stations, and/or the like. However, it should be understood that a stationary node 104S need not be associated with infrastructure that is permanently fixed at a given location and, thus, stationary nodes 104S can include nodes that are associated with infrastructure intended to be temporarily placed at a selected location in a stationary or non-mobile state. For instance, a stationary node 104S may be movable (in the sense that it can be repositioned or relocated to a different location, such as a node associated with network infrastructure installed on a trailer) as long as its normal operating state when communicating data across the mesh network 102 is associated with such node being positioned at a selected location.

Each node 104 within the system 100 may generally be formed by suitable networking equipment configured to wirelessly transmit/receive data. For instance, in several embodiments, each node 104 may be formed by one or more wireless communication devices 110, such as one or more radios including one or more antennas and/or any other suitable wireless networking equipment, configured to wirelessly transmit RF signals according to any suitable wireless communications protocol. In accordance with aspects of the present subject matter, each wireless communication device 110 is configured to operate as a MAC-level device when functioning as a node 104 within the wireless mesh network 102. In other words, each wireless communication device 110 is configured to operate on the data link layer (or OSI layer 2) and utilizes MAC addresses to determine the path across which data is to be forwarded. In this regard, each wireless communications device 110 is associated with a unique MAC address for facilitating communications across the network 102. Moreover, it should be appreciated that as, MAC-level devices, the various wireless communication devices 110 are not configured to route data to a remote network, such as the internet, and, thus, do not transfer data using internet protocol (IP) addresses or any other suitable layer 3 routing protocols. In other words, when receiving data from another node 104 within the mesh network 102, each wireless transmission device 110 is configured forward such data (or replicate such data for transmission) to a different node 104 within the mesh network 102 without routing the data to the internet or another remote network.

Additionally, in accordance with aspects of the present subject matter, different nodes 104 within the system 100 may be configured to communicate data across the mesh network 102 according to different wireless communication protocols. For instance, in several embodiments, a first subset of the system nodes 104 may correspond to short-range nodes configured to wirelessly communicate data across the mesh network 102 utilizing a short range wireless communications protocol or wireless local area network (WLAN) standard, such as by using any suitable IEEE 802.11 communications standard, while a second subset of the system nodes 104 may correspond to long-range nodes configured to wirelessly communicate data across the mesh network 102 utilizing a long range wireless communications protocol or wireless wide area network (WWAN) standard, such as by using any suitable wireless telecommunications or cellular network communications protocol. Specifically, in one embodiment, the various wireless communications devices 110 forming the mobile nodes 104M and a portion of the stationary nodes 104S may be configured to communicate data via a short range wireless communications protocol or WLAN standard, such as by configuring such devices as Dedicated Short-Range Communications (DSRC) units configured to transmit data wirelessly using the associated IEEE 802.11 communications standard. In such an embodiment, the remainder of the stationary nodes 104S may be configured to communicate data via a suitable cellular network communications protocol, such as the Universal Mobile Telecommunications Standard (UMTS) or 3G standard, the Long-Term Evolution (LTE) or 4G standard, the 5G new radio (NR) standard or any other suitable cellular communications protocol. In such an embodiment, the stationary nodes 104S adapted to communicate via the cellular network communications protocol(s) may function as MAC-level nodes providing long-range pathways across the wireless mesh network 102. For instance, as will be described below, one or more of the stationary nodes 104S may include or be formed by a LTE-based wireless communication device, thereby allowing one or more corresponding long-range pathways to be provided across the wireless mesh network 102.

Figure 2:
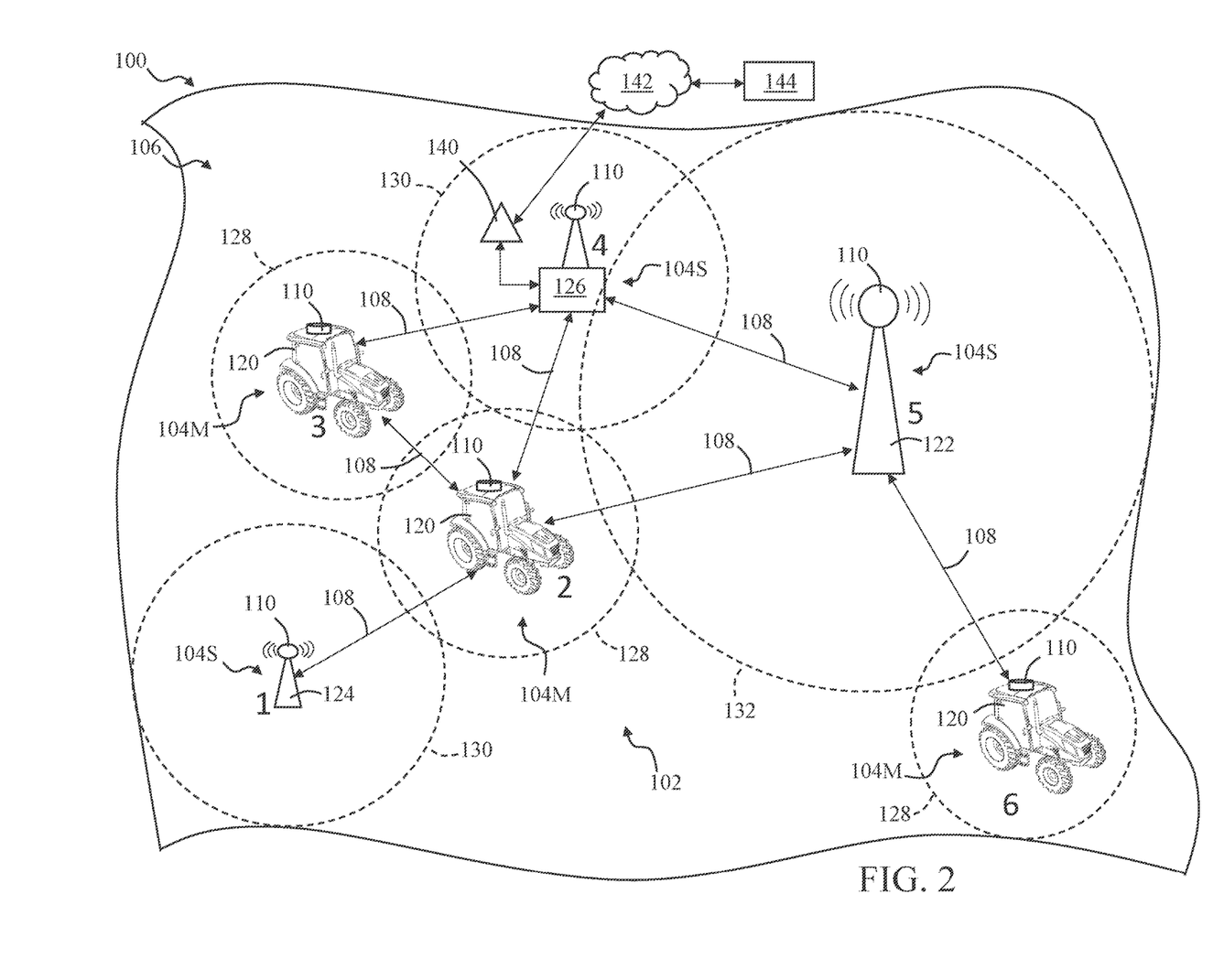
FIG. 2 illustrates a schematic view of an example implementation of one embodiment of the system shown in FIG. 1 in accordance with aspects of the present subject matter.

Referring now to FIG. 2, a schematic view of one example implementation of an embodiment of the system 100 described above with reference to FIG. 1 is illustrated in accordance with aspects of the present subject matter. As shown, the system 100 includes a plurality of wireless mesh nodes 104 (e.g., nodes 1-6) spaced apart across or otherwise positioned relative to a given area 106. Each node 104 is generally formed by a wireless communication device 110 configured to wirelessly transmit and receive data to/from the wireless communication device(s) 110 of any neighboring node(s) 104 located within its wireless communication range, thereby providing a wireless mesh network 102 across which data can be transmitted node-to-node via the pathways 108 formed between neighboring nodes 104.

Similar to the embodiment described above, a portion of the wireless mesh nodes 104 correspond to mobile nodes 104M (e.g. nodes 2, 3, and 6), while the remainder of the wireless mesh nodes 104 correspond to stationary nodes 104S (e.g. nodes 1, 4, and 5). In several embodiments, the wireless communication devices 110 forming the mobile nodes 104M may be installed on/within or otherwise provided in operative association with a work vehicle configured to traverse across the area 106 covered by the wireless mesh network 102. For instance, as shown in the illustrated embodiment, each mobile node 104M is provided in operative association with an agricultural tractor 120. However, in other embodiments, the mobile nodes 104M may be provided in operative association with any other suitable work vehicle (including any combination of the same/different types of work vehicles), such as any other type of agricultural vehicle (e.g., a harvester, receiver vehicle, self-propelled windrower, and/or the like), a construction vehicle, and/or any other suitable type of work vehicle, including work vehicles configured to otherwise perform an operation on or within the area 106. Alternatively, the wireless communication devices 110 forming the mobile nodes 104M may be installed on/within or otherwise provided in operative association with any other suitable type of mobile equipment generally configured to be moved across the area 106.

Moreover, the wireless communication devices 110 forming the stationary nodes 104S may be installed on/within or otherwise provided in operative association with suitable infrastructure (e.g., including towers, stations, units, and/or other suitable components) configured to generally remain stationary (unless, for example, the node is being temporarily relocated or repositioned). For instance, in the illustrated embodiment, one of the stationary nodes 104S (e.g., node 5) is formed by a wireless communication device 110 installed on a large, permanent tower structure 122 (e.g., a cellular tower, such as a monopole, lattice, or guyed tower), while another stationary node 104S (e.g., node 1) is formed by a wireless communication device 110 installed on a smaller communication tower or structure 124 (e.g., networking equipment installed on a trailer or towable). Additionally, as shown in FIG. 2, yet another stationary node 104S (e.g., node 4) is formed by a wireless communication device installed on or otherwise forming part of a local server or base station 126 positioned within the area 106. Of course, it should be appreciated that, in other embodiments, the wireless communication devices 110 forming the stationary nodes 104S may be installed on/within or otherwise provided in operative association with any other suitable infrastructure.

Referring still to FIG. 2, in several embodiments, the various wireless communications devices 110 forming the mobile nodes 104M (e.g., nodes 2, 3, and 6) and a portion of the stationary nodes 104S (e.g., nodes 1 and 4) may be configured to communicate data across the network 102 via a short-range wireless communications protocol or WLAN standard. In such embodiments, each of these short-range nodes may be associated with a given wireless communication range corresponding to the distance over which wireless signals may be transmitted via the associated wireless communication devices 110. For instance, as shown in FIG. 2, the wireless communication devices 110 forming each mobile node 104M have a first communication range (indicated by dashed circle 128) and the wireless communication devices 110 forming each short-range stationary node 104S have a second communication range (indicated by dashed circle 130). It should be appreciated that the length or distance associated with the first and second communication ranges 128, 130 may generally vary depending the specific communication protocol being executed and the associated frequency at which the wireless signals are being transmitted. For instance, in one embodiment, the wireless communication device 100 forming each mobile node 104M and the short-range stationary nodes 104S may correspond to or include a DSRC antenna or other DSRC-compatible device configured to transmit data wirelessly using the associated IEEE 802.11 communications standard. In such an embodiment, the wireless communication ranges 128, 130 for such nodes may generally span up to approximately one kilometer, depending on the communication type. For instance, the wireless communications ranges 130 for the short-range stationary nodes 104S may extend up to approximately one kilometer to establish vehicle-to-infrastructure communications (e.g., between a short-range stationary node 104S and a mobile node 104M) or infrastructure-to-infrastructure communications (e.g., between short-range stationary modes 104M). In contrast, the wireless communications ranges 128 for the mobile nodes 104M may be significantly shorter (e.g., approximately 100 meters) when establishing vehicle-to-vehicle communications.

While these communication ranges 128, 130 can often provide suitable coverage areas for smaller wireless mesh networks, such ranges may not be suitable/practical when establishing a wireless mesh network across a larger outdoor work area. In such instances, as indicated above, the system 100 includes one or more nodes 104 (e.g., one or more stationary nodes 104S) configured to communicate data across the mesh network 102 utilizing a long-range wireless communications protocol or wireless wide area network (WWAN) standard. For instance, in the illustrated embodiment, one of the stationary nodes 104S (e.g., node 5) is configured to communicate via a suitable cellular network communications protocol, thereby providing such node 104S with a significantly larger wireless communication range (e.g., indicated by dashed circle 132). In such instance, the length or distance associated with the communication range may generally vary depending the communications protocol being executed and the associated frequency at which the wireless signals are being transmitted. For example, in one embodiment, the long-range stationary node 104S may be configured to wirelessly communicate data using the LTE standard, which can provide a communications range of up to approximately twenty kilometers. With such a configuration, a single long-range node 104 may be used to significantly expand the coverage area of the wireless mesh network 102.

It should be appreciated that each long-range node 104 may be set-up to provide a long-range pathway across the MAC-level network 102 by appropriately configuring its associated wireless communication device 110. For instance, to set-up a long-range LTE node, the internal server, such as the Evolved Packet Core (EPC) server, used within the LTE-based wireless communication device 110 may be configured to pass all layer 2 or data link layer traffic based on the MAC addresses of other nodes 104 or devices 110 within the network 102.

Additionally, it should be appreciated that the disclosed system 100 may generally include any suitable number of nodes 104, including any suitable number of mobile nodes 104M and stationary nodes 104S, depending on, for example, the requirements of the network 102 (e.g., the desired coverage area) and the amount of mobile equipment being used across the area to be covered. For instance, although the system of FIG. 2 is shown as including a single long-range stationary node 104S and two short-range stationary nodes 104S the system 100 may generally include any suitable number and combination of long-range and short-range stationary nodes 104S.

Moreover, similar to the embodiment described above with reference to FIG. 1, each wireless communication device 110 is configured to function as a MAC-level device when operating as a node 104 within the wireless mesh network 102 (including the mobile nodes 104M and the stationary nodes 104S) and, thus, works on the data link layer (or OSI layer 2) using MAC addresses to determine that path across which data is to be forwarded. Thus, it should be appreciated that, although one or more of the network nodes 104 are configured to wireless communicate via a long-range or cellular network communications protocol, the data passing through such node(s) 104 is not routed to a remote network, such as the internet. Rather, when receiving data from another node 104 within the mesh network 102, such long-range nodes are configured to forward such data (or replicate such data for transmission) to a different node 104 within the mesh 102 as opposed to executing any layer 3 routing.

Thus, the disclosed system 100 provides a wireless mesh network 102 including a plurality of nodes 104 formed from a corresponding number of MAC-level wireless communication devices 110, with such nodes 104 being adapted to communicate according to at least one short-range wireless communications protocol and at least one long-range wireless communications protocol. As a result, when transmitting data through the network 102, a given node 104 may be provided with short-range and/or long-range channels or pathways 108 for transmitting data to a neighboring node 104. For example, in embodiments in which the mobile nodes 104M and short-range stationary nodes 104S are configured to communicate via a DSRC-based communication protocol (e.g., via a DSRC compatible radio or other suitable device) and the long-range stationary node(s) 104S is configured to communicate via an LTE-based communication protocol (e.g., via a LTE-compatible radio or other suitable device), the wireless mesh network 102 may include both DSRC-based and LTE-based pathways.

In such embodiments, the layer 2 routing protocol used to transmit data across the network 102 may be adapted to account for such short-range and long-range pathways. For instance, in the illustrated embodiment, the current position of node #2 allows the associated wireless communication device 110 to communicate via short-range communications to node #3 (e.g., as vehicle-to-vehicle communications) and nodes #1 and #4 (e.g., as vehicle-to-infrastructure communications), and via long-range communications to node #5 (e.g., as vehicle-to-infrastructure communications). In such instance, to communicate data from node #2 to node #6, the layer 2 routing protocol may, for instance, take into account one or more network-related criteria (e.g., number of hops, minimum transmission time, node-to-node distances, signal strength, such as received signal strength indicator (RSSI), signal-to-noise ratio (SNR), transmission rates, available bandwidths, network latency, network type, the amount of utilization of each node, etc.) to assess the various short-range and long-range pathways available for transferring data across the wireless mesh network 102.

Additionally, given that the various short-range and long-range nodes 104 of the mesh network 102 are formed using MAC-level communications devices 120, the system 100 may generally require a separate layer 3 router when it is desired for data to be transmitted from the wireless mesh network 102 to a remote network, such as the internet. For instance, as shown in FIG. 2, the system 100 includes a wireless router 140 (or cellular modem) in communication with one of the wireless communication devices 110 to allow data from the wireless mesh network 102 to be transmitted via a remote network 142 to a remote server 144, such as a cloud computing system. For instance, sensor data and other suitable data collected and/or generated during operation of the associated work vehicles may be transmitted via the wireless mesh network 102 to the wireless router 140 for subsequent transmission to the remote server 144 for storage and/or further processing/analysis. It should be appreciated that, for purposes of illustration, the wireless router 140 is shown as being communicatively coupled to the wireless communication device 110 of node #4 (e.g., via the base station 126). However, in other embodiments, the wireless router 140 may be communicatively coupled to the wireless communications device 100 forming any other suitable node 104 within the mesh network 102. For instance, in one alternative embodiment, it may be desirable for the wireless router 140 to be installed on the same structure or at the same location as the wireless communication device 110 forming one of the long-range stationary nodes 104S (e.g., node #5).

Figure 3:
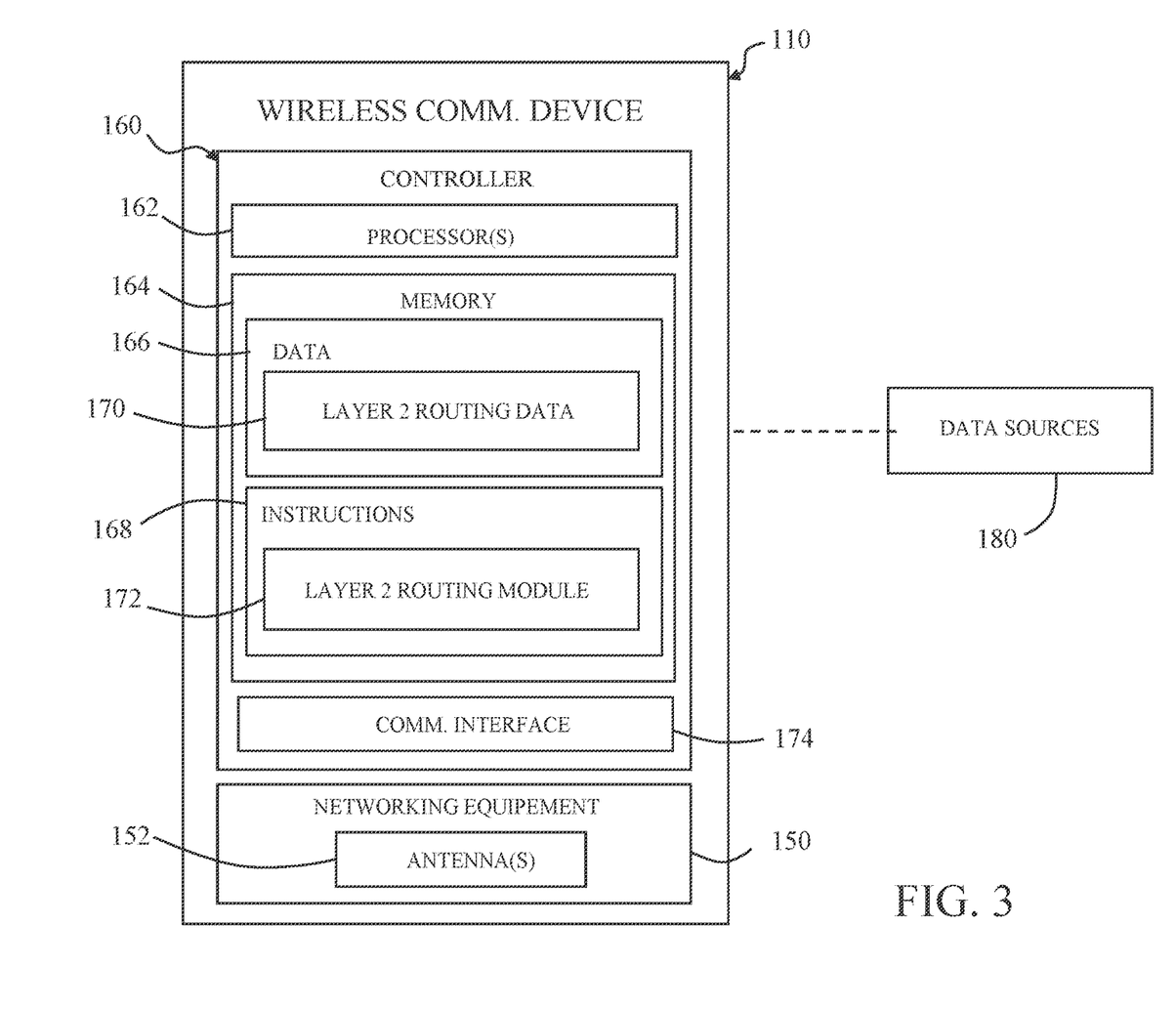
FIG. 3 illustrates a schematic view of one embodiment of a wireless communication device configured for use within a system for providing a Media Access Control (MAC) level (or data link layer) wireless mesh network in accordance with aspects of the present subject matter.

Referring now to FIG. 3, a schematic view of one embodiment of a wireless communications device 110 suitable for use as a node within a MAC-level wireless mesh network is illustrated in accordance with aspects of the present subject matter. In general, the wireless communication device 110 shown in FIG. 3 will be described with reference to the example embodiments of the system 100 described above with reference to FIGS. 1 and 2. However, it should be appreciated that, in other embodiments, the wireless communication device 110 may be utilized within any other suitable system having any other suitable system configuration or architecture that allows for a MAC-level wireless mesh network to be established in a manner consistent with the disclosure provided herein.

As shown in FIG. 3, the wireless communication device 110 may generally include or be coupled to suitable networking equipment 150 configured to facilitate wireless communications with other wireless communications devices 110 across the mesh network 120. For instance, the networking equipment 150 may include one or more antennas 152 for transmitting and receiving RF signals across the wireless mesh network 102. In one embodiment, the antennas 152 may be configured for wireless communications in accordance with any number of communications protocols, including configuring one or more of the antennas 152 as dedicated antenna(s) for communicating according to a given wireless communications protocol. For instance, in one embodiment, the antennas 152 may include one or more short-range antennas for short-range communications, such as one or more DSRC antennas for communicating via the associated DSRC protocol. Additionally, in one embodiment, the antennas 152 may include one or more long-range antennas for long-range communications, such as one or more LTE antennas for communicating via the associated LTE protocol.

Moreover, the wireless communications device 110 may also include or be in communication with a controller 160. In general, the controller 160 may correspond to any suitable processor-based device(s), such as a computing device or any combination of computing devices. Thus, as shown in FIG. 3, the controller 160 may generally include one or more processor(s) 162 and associated memory devices 164 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 164 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 164 may generally be configured to store information accessible to the processor(s) 162, including data 166 that can be retrieved, manipulated, created and/or stored by the processor(s) 162 and instructions 168 that can be executed by the processor(s) 162.

In several embodiments, the data 166 may be stored in one or more databases. For example, the memory 164 may include a layer 2 routing database 170 for storing data associated with the layer 2 scheme or protocol used for routing data across the wireless mesh network 102, such as data associated with the criteria used to determine the desired nodal pathway to be used for transmitting data from one node 104 to another node 104 across the network 102. As indicated above, suitable criteria may include, but is not limited to, the number of hops or nodes between the initial transmitting node and the final destination node, the minimum required or desired transmission time, node-to-node distances, signal strength (e.g., RSSI), SNR, node transmission rates, available bandwidths, network latency, network type, the amount of utilization of each node, and/or the like.

Additionally, as shown in 3, in several embodiments, the instructions 168 stored within the memory 164 of the controller 160 may be executed by the processor(s) 162 to implement a layer 2 routing module 172. In general, the routing module 172 may be configured to implement or execute the desired routing protocol or scheme for the MAC-level wireless mesh network 102. In this regard, it should be appreciated that various different layer 2 routing protocols may be used that rely on one or a combination of relevant routing criteria to determine the most appropriate or desired path for communicating data across the network 102. For instance, layer 2 routing protocols are often designed to select either the best quality pathway/link between neighboring nodes or the fastest pathway/link between neighboring nodes. Suitable layer 2 routing protocols include, for example, the Better Approach to Mobile Ad-Hoc Networking (B.A.T.M.A.N) protocol and the Almighty Lightweight Fact Remote Exchange Daemon (A.L.F.R.E.D) protocol, both of which are publicly available via open source software.

It should be appreciated that, in accordance with embodiments of the disclosed system 100, the layer 2 routing protocol may generally be designed take into the account the communications mode or wireless communications protocol available to each node 104, such as a short-range and/or long-range communications protocol. For instance, when there are two available communication paths/links between two nodes 104 (one of which is a short-range channel and the other of which is a long-range channel), the routing protocol is generally configured to analyze both channels to determine the best available path/link. Specifically, with reference to the embodiment of the system 100 described above with reference to FIG. 2, a transmitting node 104 may have both a DSRC channel and an LTE channel available for communicating data to another node 104 across the network 102. In such instance, the routing protocol may consider suitable criteria, such as the available bandwidth across each channel, the amount of utilization of each channel, the associated ping times or latency, and/or the like, to select the desired path for transmitting the data.

Referring still to FIG. 3, the controller 160 may also include a communications interface 174 to provide a means for the controller 160 to communicate with any of the various other system components described herein. For instance, one or more communicative links or interfaces (e.g., one or more data buses) may be provided between the controller 160 and the networking equipment 150 to allow data to be transmitted between such components. In addition, the communications interface 174 may also allow controller 160 to be communicatively coupled to one or more data sources 180 for receiving data to be transmitted across the wireless mesh network 102. For instance, for s wireless communications device 110 installed on mobile equipment, such as a work vehicle, the communications interface 174 may allow data from various sources on the vehicle to be communicated to the controller 160 for subsequent storage/processing and/or for transmission across the network 102 (e.g., via the antennas 152), such as sensor data, vehicle data, operating data, work communications, and/or the like. In such an embodiment, the data from the various vehicle-based data sources 180 may be communicated via the mesh network 102 to another work vehicle and/or to the local base station 126 to provide information associated with ongoing operations, such as agricultural operations, being performed across the area 106.

Figure 4:
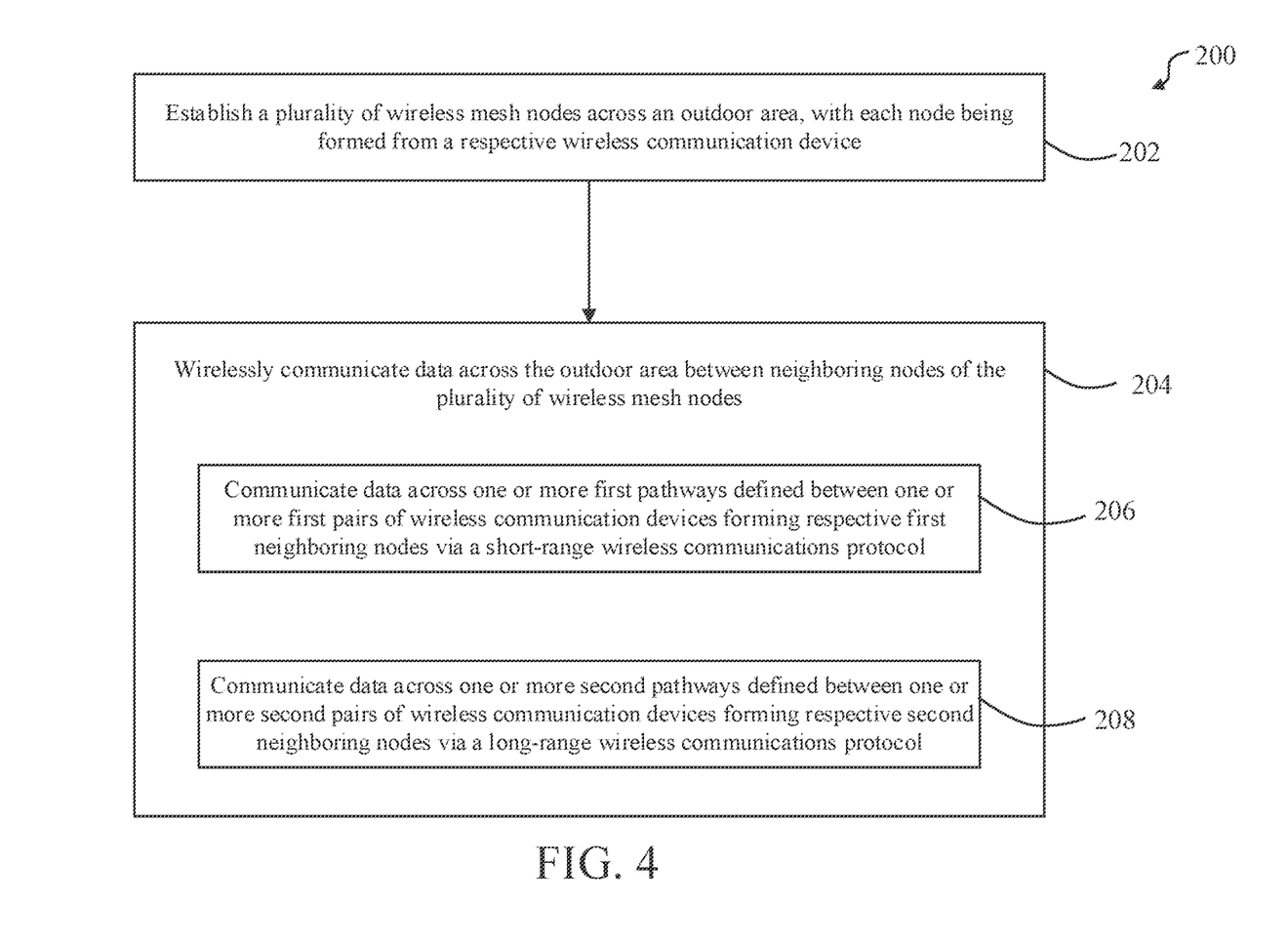
FIG. 4 illustrates a flow diagram of one embodiment of a method for providing a Media Access Control (MAC) level (or data link layer) wireless mesh network in accordance with aspects of the present subject matter.

Referring now to FIG. 4, a flow diagram of one embodiment of a method 200 for providing a Media Access Control (MAC) level wireless mesh network is illustrated in accordance with aspects of the present subject matter. For purposes of discussion, the method 200 will generally be described herein with reference to the system 100 and system components described above with reference to FIGS. 1-3. However, it should be appreciated that the disclosed method 200 may be executed in association with any suitable system having any other suitable system configuration and/or combination of system components. Additionally, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202) the method 200 may include establishing a plurality of wireless mesh nodes across an outdoor area, with each node being formed from a respective wireless communication device. For instance, as described above, a plurality of wireless mesh nodes 104, including a plurality of mobile nodes 104M and a plurality of stationary nodes 104S, may be provides across a given area 106. In such an embodiment, each mobile node 104M and each stationary node 104S may be formed from a respective wireless communication device 110 configured to function as a MAC-level (or data link layer) device when communicating data across the wireless mesh network 102. For instance, each wireless communication device 110 may be configured to route or communicate data across the network 102 according to the MAC addresses of the various other communications devices 110 forming network nodes 104.

Additionally, at (204), the method 200 may include wirelessly communicating data across the outdoor area between neighboring nodes of the plurality of wireless mesh nodes. As indicated above, the data may be communicated across the mesh network 102 between neighboring nodes using various different wireless communication protocols, including short-range and long-range wireless communications protocols. As a result, both short-range and long-range pathways may be established across the network 102 for providing node-to-node communications.

For example, as described above, in one embodiment, a subset of the nodes 104 included within the mesh network 102 (e.g., the mobile nodes 104M and a portion of the stationary nodes 102S) may be configured as short-range nodes. In such an embodiment, the communication process across the network 102 may include, at (206), communicating data across one or more first pathways defined between one or more first pairs of wireless communication devices forming respective first neighboring nodes via a short-range wireless communications protocol. Specifically, for two neighboring short-range nodes 104, the wireless communication devices 110 forming such nodes 104 may be configured to transmit data between the nodes across a short-range pathway established via the applicable short-range wireless communications protocol, such as the DSRC protocol.

Moreover, as indicated above, in addition to the short-range nodes, a subset of the nodes 104 included within the mesh network 102 (e.g., the remainder of the stationary nodes 102S) may be configured as long-range nodes. In such an embodiment, the communication process across the network 102 may include, at (208), communicating data across one or more second pathways defined between one or more second pairs of wireless communication devices forming respective second neighboring nodes within the wireless network via a long-range wireless communications protocol. Specifically, for two neighboring nodes 104 in which at least one of the nodes is configured as a long-range node, data may be transmitted from the wireless communication device 110 forming the long-range node to the neighboring node across a long-range pathway established via the applicable long-range wireless communications protocol, such as the LTE protocol.

It is to be understood that, in one embodiment, the steps of the method 200 are performed by a computing device(s) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing device(s) described herein, such as the method 200, is implemented in software code or instructions which are tangibly stored on a tangible computer readable medium. The computing device(s) loads the software code or instructions via a direct interface with the computer readable medium or via a wired and/or wireless network. Upon loading and executing such software code or instructions by the computing device(s), the computing device(s) may perform any of the functionality of the computing device(s) described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing a wireless mesh network, the system comprising:
   a plurality of wireless mesh nodes positioned relative to an outdoor area, the plurality of wireless mesh nodes comprising a plurality of stationary nodes spaced apart from one another across the outdoor area and a plurality of mobile nodes configured to be moved across the outdoor area;
   wherein:
   each of the plurality of stationary and mobile nodes is formed from a respective wireless communication device, with each wireless communication device being configured to function as a Media Access Control (MAC) level device when communicating data across the wireless mesh network;
   the wireless communication device forming each respective mobile node is configured to communicate data across the wireless mesh network using a short-range wireless communications protocol; and
   at least a portion the wireless communication devices forming the plurality of stationary nodes are configured to communicate data across the wireless mesh network using a long-range wireless communications protocol.

2. The system according to claim 1, wherein the wireless communication device forming each respective mobile node is supported relative to a work vehicle configured to be traversed across the outdoor area.

3. The system according to claim 2, wherein the work vehicle comprises an agricultural work vehicle.

4. The system according to claim 1, wherein the short-range wireless communications protocol comprises a dedicated short-range communications (DSRC) protocol.

5. The system according to claim 1, wherein the long-range wireless communications protocol comprises a cellular wireless communications protocol.

6. The system according to claim 1, wherein the long-range wireless communications protocol comprises a Long-Term Evolution (LTE) protocol.

7. The system according to claim 1, wherein a first subset of the wireless communication devices forming the plurality of stationary nodes are configured to communicate data using the long-range wireless communications protocol and a second subset of the wireless communication devices forming the plurality of stationary nodes are configured to communicate data using the short-range wireless communications protocol.

8. The system according to claim 7, wherein the short-range wireless communications protocol comprises a dedicated short-range communications (DSRC) protocol and the long-range wireless communications protocol comprises a Long-Term Evolution (LTE) protocol.

9. The system according to claim 1, wherein each wireless communication device is configured to execute a layer 2 routing protocol for communicating data across the wireless mesh network.

10. A method for providing a wireless mesh network, the method comprising:
    establishing a plurality of wireless mesh nodes across an outdoor area, each of the plurality of wireless mesh nodes being formed from a respective wireless communication device, with each wireless communication device being configured to function as a Media Access Control (MAC) level device when communicating data across the wireless mesh network; and
    wirelessly communicating data across the outdoor area between neighboring nodes of the plurality of wireless mesh nodes, wherein such wireless communications of the data comprises:
        communicating data across one or more first pathways defined between one or more first pairs of wireless communication devices forming respective first neighboring nodes within the wireless mesh network via a short-range wireless communications protocol; and
        communicating data across one or more second pathways defined between one or more second pairs of wireless communication devices forming respective second neighboring nodes within the wireless network via a long-range wireless communications protocol.

11. The method according to claim 10, wherein the plurality of wireless mesh nodes comprises a plurality of stationary nodes spaced apart from one another across the outdoor area and a plurality of mobile nodes configured to be moved across the outdoor area.

12. The method according to claim 11, wherein the wireless communication device forming each respective mobile node is supported relative to a work vehicle configured to be traversed across the outdoor area.

13. The method according to claim 12, wherein the work vehicle comprises an agricultural work vehicle.

14. The method according to claim 11, wherein a first subset of the wireless communication devices forming the plurality of stationary nodes are configured to communicate data using the long-range wireless communications protocol and a second subset of the wireless communication devices forming the plurality of stationary nodes are configured to communicate data using the short-range wireless communications protocol.

15. The method according to claim 14, wherein the one or more pairs of first wireless communications devices comprises a pair of wireless communication devices forming at least one of neighboring nodes of the plurality of mobile nodes, neighboring nodes of the second subset of stationary nodes, or neighboring nodes including a respective mobile node together with a respective stationary node of the second subset of stationary nodes.

16. The method according to claim 14, wherein the one or more pairs of second wireless communications devices comprise a pair of wireless communication devices forming at least one of neighboring nodes of the first subset of stationary nodes, neighboring nodes including a respective mobile node together with a respective stationary node of the first subset of stationary nodes, or a respective stationary node of the first subset of stationary nodes together with a respective stationary node of the second subset of stationary nodes.

17. The method according to claim 10, wherein the short-range wireless communications protocol comprises a dedicated short-range communications (DSRC) protocol.

18. The method according to claim 10, wherein the long-range wireless communications protocol comprises a cellular wireless communications protocol.

19. The method according to claim 10, wherein the long-range cellular wireless communications protocol comprises a Long-Term Evolution (LTE) protocol.

20. The method according to claim 10, wherein wirelessly communicating data across the outdoor area comprises wireless communicating data between neighboring nodes of the plurality of wireless mesh nodes according to a layer 2 routing protocol that takes into account the availability of short-range pathways provided via the short-range wireless communications protocol and long-range pathways provided via the long-range wireless communications protocol.

* * * * *